US012613753B2

(12) United States Patent
    Shapiro

(10) Patent No.:     US 12,613,753 B2
(45) Date of Patent:     Apr. 28, 2026

(54) ARCHITECTURE TO PREVENT CONTROLLER-TO-CONTROLLER DEADLOCK

(71) Applicant: Microsoft Technology Licensing, LLC, Redmond, WA (US)

(72) Inventor: Yaron Baruch Shapiro, Petach Tikva (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 434 days.

(21) Appl. No.: 18/308,402

(22) Filed: Apr. 27, 2023

(65) Prior Publication Data

US 2024/0362085 A1      Oct. 31, 2024

(51) Int. Cl.
    *G06F 9/52*          (2006.01)
    *G06F 13/42*         (2006.01)
(52) U.S. Cl.
    CPC .......... *G06F 9/524* (2013.01); *G06F 13/4282* (2013.01)
(58) Field of Classification Search
    CPC .............................. G06F 9/524; G06F 13/4282
    See application file for complete search history.

(56) References Cited

U.S. PATENT DOCUMENTS

2007/0240019 A1*  10/2007  Brady ................. G06F 13/4291
                                                          710/110
2017/0075852 A1*   3/2017  Mishra ................ G06F 13/4282

2020/0012612 A1  1/2020  Takahashi
2020/0034260 A1  1/2020  Eder et al.
2020/0133904 A1  4/2020  Takahashi et al.

OTHER PUBLICATIONS

International Search Report and Written Opinion received for PCT Application No. PCT/US2024/024533, Jun. 28, 2024, 11 pages.
MIPI Alliance, "I3C Application Note: Hot-Join", Retrieved from the URL: https://f.hubspotusercontent20.net/hubfs/2384176/mipi_13C_app-note_Hot-Join_v1-0p.pdf, Aug. 30, 2021, pp. 1-24.
"MiPi Alliance Specification for I3CSM", Retrieved from: http://www.jwill.co.kr/uploaded/10086131875be1615370d6a.pdf?PHPSESSID=bc24044366424ab44530eee17e0c944a, Dec. 23, 2016, 197 Pages.
International Preliminary Report on Patentability (Chapter I), received for PCT Application No. PCT/US2024/024533, mailed on Nov. 6, 2025, 06 pages.

* cited by examiner

*Primary Examiner* — Wissam Rashid
(74) *Attorney, Agent, or Firm* — Holzer Patel Drennan

(57)          ABSTRACT

An integrated circuit chip includes a secondary controller coupled to a deadlock solver that provides a communication interface to a primary controller. The deadlock solver stores control logic executable to detect a reset event indicator on a secondary controller that is indicative of a reset event pattern executing on the secondary controller while the secondary controller is in a reset state. Based at least in part on detection of the reset event indicator, the deadlock solver transmits a signal pattern to the secondary controller that mimics a transaction from a primary controller. The signal pattern assisting the secondary controller in exiting a reset state.

20 Claims, 5 Drawing Sheets

Slave Device
116
Secondary Controller
124

Slave Device
118
Secondary Controller
126

Master Device
106
(e.g., CPU)

Primary Controller
110

112

Off-Chip SDA 130

Off-Chip SCL 132

Hot-Join Deadlock Solver
104

SDA
138

SCL
140

Slave Device
120

Secondary Controller
128

Integrated Circuit Chip 102

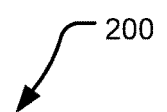
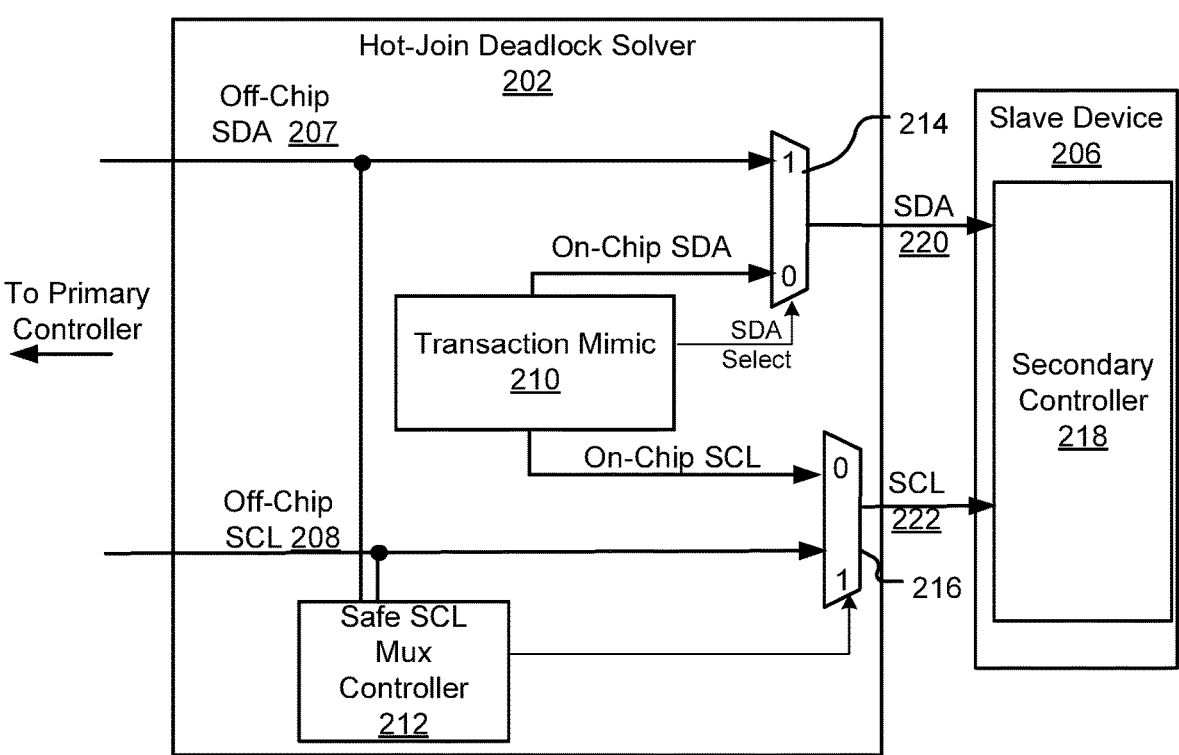
FIG. 2

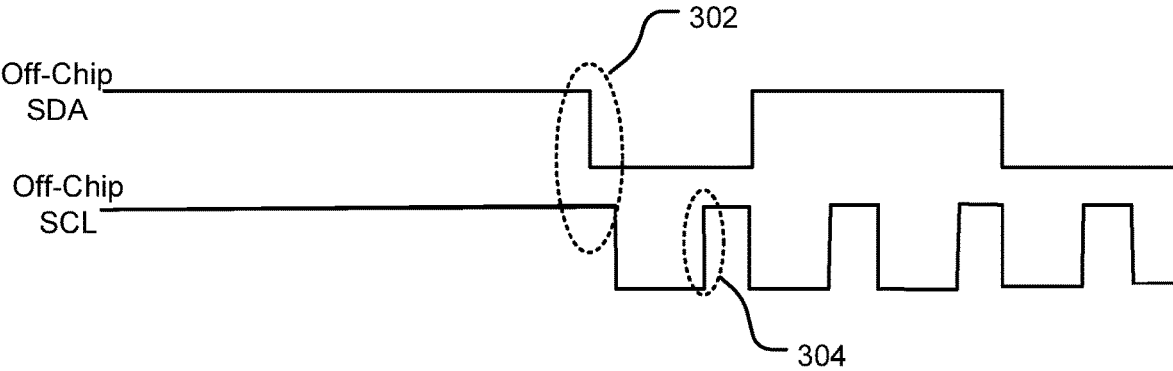
FIG. 3

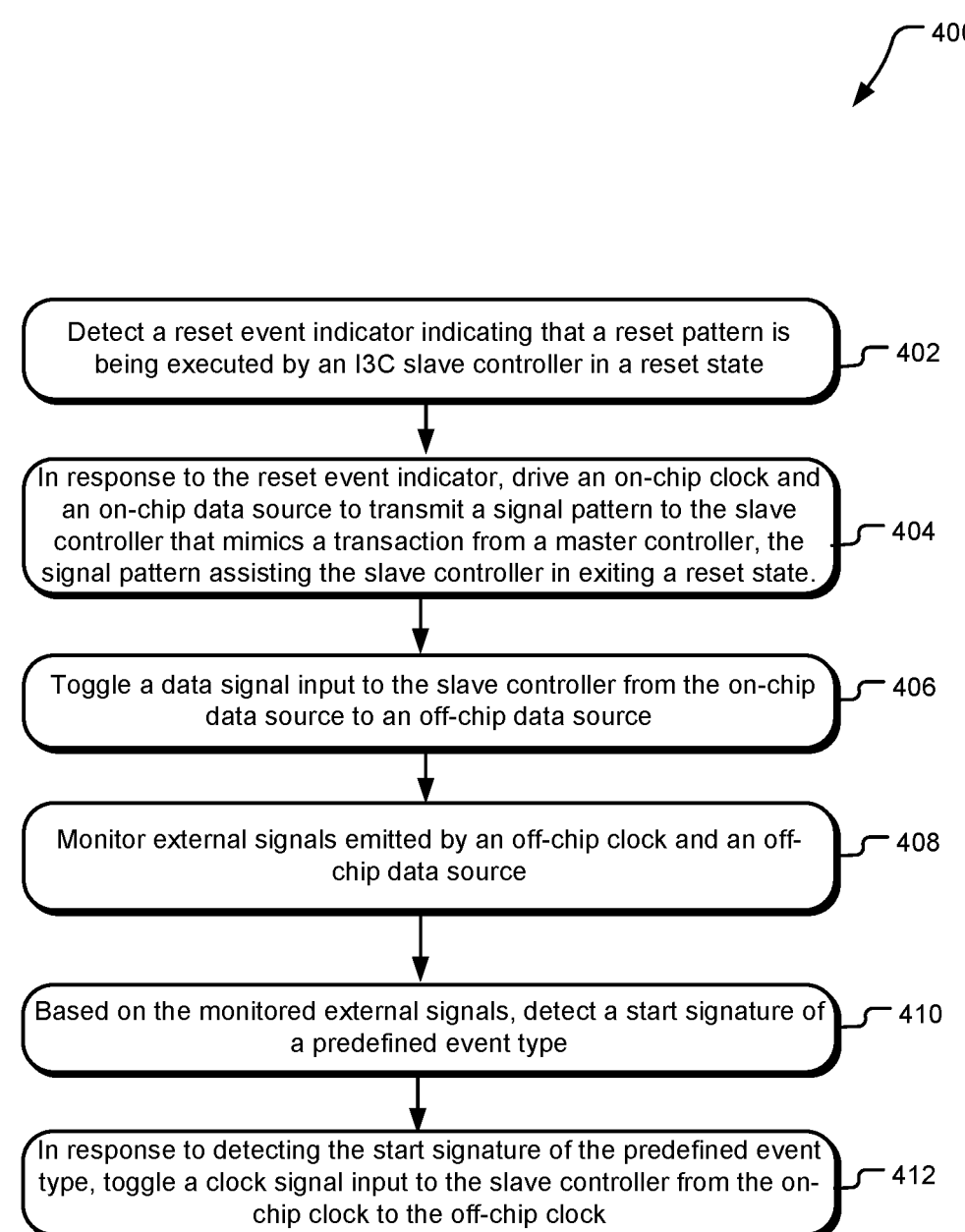

400

Detect a reset event indicator indicating that a reset pattern is being executed by an I3C slave controller in a reset state — 402

In response to the reset event indicator, drive an on-chip clock and an on-chip data source to transmit a signal pattern to the slave controller that mimics a transaction from a master controller, the signal pattern assisting the slave controller in exiting a reset state. — 404

Toggle a data signal input to the slave controller from the on-chip data source to an off-chip data source — 406

Monitor external signals emitted by an off-chip clock and an off-chip data source — 408

Based on the monitored external signals, detect a start signature of a predefined event type — 410

In response to detecting the start signature of the predefined event type, toggle a clock signal input to the slave controller from the on-chip clock to the off-chip clock — 412

FIG. 4

ARCHITECTURE TO PREVENT CONTROLLER-TO-CONTROLLER DEADLOCK

BACKGROUND

Inter-Integrated Circuit, better known as "I2C," is a serial communication protocol introduced in the 1980s that simplifies hardware connections between devices on a board by limiting the number of wires needed to connected embedded systems to just two lines: a serial data (SDA) line and a serial clock (SCL) line. The SDA line is used to send data between master and slave devices coupled to the bus while the SCL line synchronizes data transfer between the master and the slave devices.

The I3C protocol is a standardized protocol designed to overcome some of the limitations of I2C, such as by enabling faster data transfer speeds and making operations more energy efficient. An I3C communication bus includes many of the same components as an I2C bus, including the two primary bus lines (SDA and SCL) and various controllers that each facilitate communication behalf of a corresponding device coupled to the I3C bus. These controllers are of two different types-master (sometimes referred to as "controller") and slave (sometimes referred to as "target"), each of which include a microprocessor that executes firmware capable of interpreting and transmitting a defined set communications of the I3C protocol across the I3C bus.

SUMMARY

In one implementation, an integrated circuit (IC) chip includes a secondary controller coupled to a deadlock solver that provides a communication interface to a primary controller. The deadlock solver stores control logic executable to detect a reset event indicator that is indicator of a reset event pattern executing on the secondary controller while the secondary controller is in a reset state. In response to the reset event indicator, the deadlock solver transmits a signal pattern to the secondary controller that mimics a transaction from a primary controller. The signal pattern assisting the secondary controller in exiting a reset state.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTION OF THE DRAWINGS

FIG. 2 illustrates aspects of another example system that includes a hot-join deadlock solver to prevent hot-join deadlock scenarios on an I3C bus.

FIG. 3 illustrates a pair of serial data (SDA) and serial clock (SCL) signals that include example event types that are usable to safely trigger toggling a clock input to a slave controller between two different clock sources.

FIG. 4 illustrates example operations for preventing deadlock following slave device reset in an IC3 bus.

DETAILED DESCRIPTION

Figure 1:
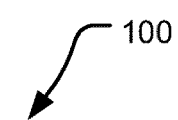
FIG. 1 illustrates an example I3C system including an integrated circuit chip with a hot-join deadlock solver that prevents hot-join deadlock between a primary controller (e.g., master) and a secondary controller (e.g., slave).

One notable improvement offered by the I3C protocol as compared to the I2C protocol is a dynamic addressing feature that allows a master I3C controller to assign a 7-bit dynamic address to each connected slave device on an I3C bus. In I2C buses, device addressing was static and, and each I2C device was typically assigned a static address during production. This practice led to problems with duplicate addresses potentially co-existing on a same bus. In I3C, duplicate addressing problems are eliminated due to the fact that each I3C slave device receives a unique address from the master.

In an I3C bus, slave device addresses are dynamically assigned when the I3C bus is initially powered on and configured. However, another notable improvement of I3C is a feature that allows a device to join the I3C bus and request a dynamic address at any point in time after the power-on and configuration of the I3C bus. This feature is known as the "Hot-Join" mechanism and is invoked when a joining slave device sends an In-Band-Interrupt (IBI) request across the bus. This IBI request signals the start of a "Hot-Join procedure" in which a sequence of communications are exchanged between the master and the joining slave to dynamically assign an address to the slave. This address assignment allows the slave device to fully participate in I3C bus activity.

In order to send the IBI request to initiate the Hot-Join procedure, a newly-joining device waits to detect a Bus Idle condition and then pulls the SDA line low (e.g., from 1 to 0). This serves to notify the master controller (also referred to herein as the "primary controller") of a new device joining the bus, and the master controller responds by pulling the SCL line low to generate a start condition followed by a sequence of additional signal communications that effect the dynamic address assignment.

The herein disclosed technology provides a solution to a shortcoming in the existing I3C protocol that can, in specific circumstances, preclude a slave device from effectively initiating the Hot-Join procedure. In order to be able to initiate a Hot-Join procedure (e.g., by detecting the above-mentioned Bus Idle condition and pulling the SDA line low), the slave device must first be powered on and fully operational. When a slave device is first powered on, the associated slave controller executes a default reset pattern that includes, an internal reset, which is synchronized to the clock of the master controller. While the reset pattern is executing, the slave device is said to be in a "reset state." A slave device "exits" the reset state once the reset pattern successfully executes to completion. One step in this reset sequence includes a reset of the slave controller in which a reset of the slave controller is synchronized with the SCL clock of the master controller. This clock synchronization is not instantaneous and typically takes a few clock cycles to complete. Specifically, the slave controller needs to observe a few (e.g., 3 or more) pulse edges of the master controller's clock signal to complete this synchronization that allows the slave controller to exit the reset state. What this means is that the slave controller is unable to exit the reset state if the master controller's clock is idle (e.g., in sleep mode). In these scenarios, the slave device is effectively "stuck" in reset for an indefinite period of time.

In a vast majority of scenarios, the hot-join procedure is invoked when there are already slave devices coupled to the I3C bus actively communicating with the master device. In these scenarios, the master controller's clock is actively toggling and any device attempting to hot-join can therefore perform the clock synchronization step of the reset pattern without issue. However, the exist scenarios when the master controller's clock is idle (e.g., held in the 0 state). If, for example, the I3C bus is initialized at time when there are no slave devices coupled to the bus, the master controller tries, during the bus initialization, to dynamically assign addresses to listening slave devices. However, when there are no slave devices coupled to the bus, the master controller does not receive an answer to this address assignment attempt. Consequently, the master controller enters a sleep mode until such time that a slave device subsequently initiates the hot-join procedure.

In the sleep mode, the master controller's clock is typically maintained in the idle state to save power. This means that the clock signal is not toggling on the SCL line output from the master controller and any slave device attempting to exit a reset state is therefore unable to perform the clock reset step that is needed to complete its reset pattern. This scenario is referred to herein as "hot-join deadlock"— meaning, the hot-join procedure cannot be initiated and the slave device is unable to join the bus. One possible solution to this "hot-join deadlock" problem is to program the master controller to periodically send out a transaction (e.g., every 30 seconds or at other repeated interval) to essentially "invite" slave devices to initiate the hot-joint procedure. However, this solution is very power inefficient, as it depends upon waking up the host (master) device at repeated intervals even if no devices are waiting to hot-join the bus.

The disclosed technology includes hardware and control logic, referred to herein as a "deadlock solver" that provides an interface between the master controller and the slave controller. Each time the slave controller executes a default reset pattern, the deadlock solver provides the slave controller with a signal pattern that mimics an I3C transaction from a master controller. Consequently, the slave controller receives an SCL signal input that is usable to perform a clock reset operation needed to successfully complete the slave's default reset pattern. Effectively, this "mimicked" transaction allows the slave controller to successfully complete the reset pattern and exit the reset state at all times, even if the master controller is not toggling its clock. In this way, the deadlock solver prevents the above-described hot-join "deadlock" scenario in a power-efficient way.

In one implementation, the deadlock solver additionally performs actions to safely switch a source input signals for the slave controller from an on-chip origin (e.g., a data generation source and clock of the deadlock solver) back to the main bus signals of external origin (e.g., those generated by the master controller). This is particularly important with respect to the SCL input, since there is a high potential to cause a hardware glitch that causes an unknown state or metastability in the digital circuit if the slave controller happens to lock onto an SCL signal at the exact time that the SCL signal transitions from low to high or high to low. This type of glitch can generate a system error that may require power cycling or various diagnostics to effectively remedy. To ensure system stability, it is critical that the deadlock solver perform the switch back to the SCL signal of external origin at a time when the SCL signal is stable.

FIG. 1 illustrates an example I3C system 100 including an integrated circuit chip 102 with a hot-join deadlock solver 104 that prevents hot-join deadlock. The I3C system 100 includes a master device 106 that communicates across an I3C bus 112 through a primary controller 110 (e.g., a master controller). In various architectures, the primary controller 110 may be formed integrally with this master device 106 (e.g., on a same chip) or otherwise communicatively coupled to the master device 106.

The I3C system 100 is further shown to include multiple slave devices including slave device 116, slave device 118, and slave device 120. Each of the slave devices 116, 118, and 120 communicates across the I3C bus 112 through a corresponding slave controller, also referred to herein as a "secondary controller" (e.g., one of secondary controllers 124, 126, and 128). In various architectures, each of the secondary controllers 124, 126, and 128 are either integrally formed with their associated slave device (e.g., formed within the slave device or on a same chip, as shown) or otherwise communicatively coupled to their associated slave device.

The primary controller 110 transmits signals across the I3C bus on behalf of the master device and each of the secondary controllers 124, 126, and 128 transmits signals across the I3C bus on behalf of an associated slave device (e.g., one of the slave device 116, 118, and 120). In one implementation, the primary controller 110 and each of the secondary controllers 124, 126, and 128 include memory storing firmware and a microprocessor that executes the firmware instructions to interpret a defined set of I3C communications that facilitate data transmissions between the master device 106 and each of the slave devices 116, 118, and 120.

In FIG. 1, the slave device 120 is shown communicatively coupled to the hot-join deadlock solver 104. The hot-join deadlock solver 104 provides an interface between the slave device 120 and the I3C bus 112 that receives communications from the master device 108. The hot-join deadlock solver 104 includes control logic that is implemented in hardware, firmware, or a combination thereof, as well as components for executing the control logic (e.g., a microprocessor if the control logic is implemented in software).

In FIG. 1, the hot-join deadlock solver 104 is formed on the integrated circuit chip 102 that also include the slave device 120 and the secondary controller 128. This architecture is not a requirement and the hot-join deadlock solver 104 is, in some implementations, not formed on the IC chip as the slave device that it supports. For example, the hot-join deadlock solver 104 is formed on a separate chip designed to provide a communication interface between the slave device 120 and the master device 106. In another implementation, the hot-joint deadlock solver 104 is formed on a PCB supporting the master device 106 and is encased, along with the master device 106, in an enclosure that includes a port designed to removably couple with the slave device 120.

The I3C bus 112 includes a serial data (SDA) line for communicating data signals and a serial clock (SCL) line used for synchronizes data transfers between the master device 106 and each of the slave devices 116, 118, and 120. To distinguish these main bus SCL and SDA signals from those that originate on the hot-join deadlock solver 104, these main bus signals are labeled in FIG. 1 and referred to herein as an "off-chip SDA 130" and "off-chip SCL 132", where the term "off-chip" implies that these signals originate at a location external to the integrated circuit chip 102.

The hot-join deadlock solver 104 executes control logic that helps the secondary controller 128 complete a reset pattern each time a reset event occurs on the salve device 120. For example, the secondary controller 128 automatically initiates execution of the reset pattern when the slave device 120 boots after a power cycle or when the integrated circuit chip 102 is first physically coupled to the 112 bus.

The hot-join deadlock solver 104 includes logic that detects a reset event indicator on the secondary controller 128. The reset event indicator includes one or multiple signals generated on the slave device 120 during the reset pattern that are indicative of a reset of the secondary controller 128 (e.g., the reset event indicator is detectable exclusively when the reset pattern is being executed by the secondary controller 128). In one implementation, the reset event indicator is detected when the secondary controller 128 executes a firmware command to open an SCL line input to the slave device 120. In other implementations, the event reset indicator is detected when the secondary controller 128 transmits an implicit firmware command. In yet another implementation, the event reset indicator is detected when a posedge is observed on a reset pin of the secondary controller 128.

In response to detecting the reset event indicator on the slave control 128, the hot-join deadlock solver 104 transmits a signal pattern to the secondary controller 128 that mimics a transaction that the secondary controller 128 would expect to receive from the primary controller 110. Notably, the secondary controller 128 includes an input interface that includes a single SDA input that receives an SDA signal 138 and a single SCL input that receives an SCL signal 140. To mimic the transaction of the primary controller 110, the hot-joint deadlock solver 104 assumes temporary control of the input interface to the secondary controller 128 and locally drives the SDA signal 138 and the SCL signal 140 from the integrated circuit chip 102 instead of providing the slave controller 128 with the external main bus signals (e.g., the off-chip SDA 130 and off-chip SCL 132) to source that instead originate on the integrated circuit chip 102. Temporarily, the hot-join deadlock solver 104 locally-drives the SDA signal 138 and the SCL signal 140 to create a signal pattern that the secondary controller 128 can, in turn, recognize and safely utilize to reset an internal clock as part of the reset pattern. In effect, these locally-driven signals mimic a transaction that aids the secondary controller 128 in exiting from the reset state.

In addition to mimicking the transaction of the primary controller 110, the hot-join deadlock solver 104 executes control logic to safely switch the sources of the SDA signal 138 and the SCL signal 140 back to those driving the off-chip main bus signals (e.g., the off-chip SDA 130 and the off-chip SCL 132) after the secondary controller 128 has exited the reset state. Switching the source of the SDA signal 138 is less problematic than the switch of the source of the SCL signal 140 due to a hardware sensitivity that is known to cause a hardware glitch if the internal clock of the secondary controller 128 locks onto a new clock signal at the exact time that a signal transition is occurring in the new clock signal. If, for example, the clock of the primary controller 110 is transitioning from 0 to 1 or vice versa at the exact instant that source of the SCL signal 140 is switched back to this clock (e.g., the external SCL 132), this could cause the secondary controller 128 to lock-up, causing a hardware glitch that may result in system error.

For this reason, it is critical that the source of the SLC signal 140 be switched at a time when it is known that the newly-received clock signal is going to remain stable for a duration of time exceeding a time duration needed to re-synchronize the internal clock of the secondary controller 128 (referred to herein as the "slave clock sync time"). To achieve this assurance, the hot-join deadlock solver 104 monitors the off-chip SDA 130 and the off-chip SCL 132 and waits to detect a start of a predefined event type that is known to have a duration that exceeds the clock sync time. Examples of types of predefined events suitable for this purpose are discussed with respect to FIG. 3.

After the secondary controller 128 completes execution of the reset pattern and transitions from the reset state to a nominal operations state, the secondary controller 128 performs operations that initiate the hot-join procedure. Specifically, the secondary controller 128 monitor signals emitted by the off-chip clock and the off-chip data source waits for these signals to satisfy a Bus Idle condition. When the Bus Idle Condition is satisfied, the secondary controller 128 pulls the off-chip SDA 130 to a zero state and waits for the primary controller 110 to assign a dynamic address to the secondary controller 128 by performing further operations consistent with the I3C protocol.

FIG. 2 illustrates aspects of another example system 200 that includes a hot-join deadlock solver 202 to prevent hot-join deadlock scenarios on an I3C bus. The hot-join deadlock solver 202 includes hardware or a combination of hardware and software configured to perform actions that assist a secondary controller 218 (e.g., a slave controller coupled to a slave device) in completing a reset pattern that, in effect, enables the slave device 206 to exit a reset state.

In one implementation, the hot-join deadlock solver 202 is integrated into a larger system with architectural features the same or similar to those shown in FIG. 1. It is assumed that the system 200 includes an I3C bus with a primary controller (e.g., a controller coupled to a master device). The I3C bus includes a first communication line for transporting an SDA signal, shown as off-chip SDA 207, and also includes a second communication line for transporting a clock signal, shown as off-chip SCL 208. The primary controller includes a clock that drives the off-chip SCL 208. All controllers on the I3C have the capability of transmitting data across the main SDA line; therefore, the off-chip SDA 207 may, at a given point in time, originate at the primary controller or from any other controller on the I3C bus.

The hot-join deadlock solver 202 includes two main logical components including a transaction mimic 210 and a safe SCL mux controller 212. In various implementations, the transaction mimic 210 and the safe SCL mux controller 212 include hardware or a combination of hardware and software. The hot-join deadlock solver 202 also includes first switching circuitry, represented by a first multiplexor 214, and second switching circuitry, represented by a multiplexor 216.

The first multiplexor 214 is configured to support selective toggling of a data input source of an SDA signal 220 to the secondary controller 218. When the multiplexor 214 selects '1' as the data input source, the SDA signal 220 output from the multiplexor 214 is a signal generated by an off-chip data source (e.g., whichever controller is currently generating the SDA signal propagating along the main I3C bus line). When the multiplexor 214 is toggled to select "0" as the data input source, the SDA signal 220 output from the multiplexor 214 is a signal generated by a data source on the same chip as the hot-join deadlock solver 202 (referred to herein as an "on-chip data source) that may be conceptually understood as being included within the transaction mimic 210.

The second multiplexor 216 is similarly configured to support selective toggling of a clock input source of the SCL signal 222 to the secondary controller 218. When the multiplexor 216 selects '1' as the clock input source, the SLC signal 222 output by the multiplexor 216 is a clock signal originating at and driven by the primary controller (e.g., off-chip relative to the hot-join deadlock solver 202). When the multiplexor 216 is toggled to select "0" as the clock input source, the SCL signal 222 output by the multiplexor 216 is a signal that instead originates at an on-chip data source that may be understood as being a clock that is included within and driven by the transaction mimic 210.

In one implementation, the hot-join deadlock solver 202 is configured to select, as a default, the on-chip SDA and the on-chip SCL sources whenever the slave device is powering on after exiting a reset state. For example, the hot-join deadlock solver 202 toggles the multiplexors 214 and 216 to select the on-chip data sources during a power-down sequence of the slave device 206 or whenever a connection to the secondary controller 218 is interrupted such that the on-chip SDA and on-chip SCL are automatically selected each time the slave device 206 is first powered on. Therefore, at the time that the slave device 206 is first powered on, the SDA signal 220 and the SCL signal 222 both originate from sources driven by the hot-join deadlock solver 222. In another implementation, the hot-join deadlock solver 202 selectively toggles the multiplexors 214 and 216 to select the on-chip clock and data source in response to detecting a reset event indicator, described further below.

The transaction mimic 210 monitors activity of the secondary controller 218 to listen for reset event indicator, which may be understood as being a predefined signal, or combination of predefined signals, that signify execution of a reset pattern on the secondary controller 218. In one implementation, the transaction mimic 210 detects the reset event indicator when the secondary controller 218 observes the enabling of the clock signal on the slave controller 218. In other implementations, the reset event indicator is an explicit firmware command transmitted by the secondary controller 218.

In response to detecting the reset event indicator on the secondary controller 218, the transaction mimic 212 performs a sequence of operations that transmit an artificial master communication to the secondary controller 218 in the I3C protocol. This communication is "artificial" in the sense that it mimics a communication that the secondary controller 218 is programmed to receive from a primary controller on the I3C bus but is, of course, not from the primary controller. In one implementation, the transaction mimic 212 initiates this artificial transaction by first pulling the SDA signal 220 to low (0). After a defined period of time has elapsed while the SDA signal 220 is held low, the SCL signal 222 is then driven back to high (1). In I3C, this action universally signals a start condition that begins a transaction. Following this start condition, the transaction mimic 212 begins driving a local (on-chip) clock to that toggles the SCL signal 222 for a predefined number of clock cycles. After the predefined number of clock cycles, the transaction mimic 212 generates a stop condition by driving the SCL signal 220 to high and then, after a defined period of time has elapsed while the SDA is low and while the SCL signal 220 remains high, driving the SDA signal 220 to high, signaling the end of the transaction.

The predefined number of clock cycles may be variable in one implementation to another but is long enough to allow the secondary controller 217 to synchronize its internal clock (e.g., at least 3 clock cycles in length). In one implementation, the transaction mimic 212 cycles the on-chip clock nine times while the SDA 220 is held low, signaling nine consecutive zeros. The cycling of the on-chip clock (driven locally, by the hot-join deadlock solver 202), allows the secondary controller 218 (e.g., a slave controller)

to synchronize its own clock—a requisite step in the default reset pattern for I3C slave controllers. This synchronization is supported even at times when an idle state of the primary controller would otherwise prevent the secondary controller 218 from being able to complete this clock synchronization and thereby successfully complete the reset pattern, transitioning the secondary controller 218 from a reset mode to a nominal operational mode.

Following the transmission of this communication (e.g., mimicking a communication from the primary controller), the hot-join deadlock solver 202 performs actions to switch the sources of the SDA signal 220 and the SCL signal 22 back to the off-chip SDA 207 and the off-chip SCL 208, respectively, to allow the slave device 206 to initiate the hot-join procedure with the primary controller (e.g., to receive a dynamic address assignment and allow the slave device 206 to become fully capable of IC3 communications on the IC3 bus). Notably, the switch of the SDA input source can be safely performed at any time without a risk of hardware glitch. In one implementation, the transaction mimic 210 toggles an SDA select input on the multiplexor 214 to switch the data input source of the SDA 220 back to an off-chip data source (e.g., the primary controller or another secondary controller that is currently transmitting data along the main SDA line of the bus) as soon as the transaction mimic 210 transmits the "stop" signaling the end of the initial communication sequence.

In contrast, there is a small but very significant risk of hardware glitch (e.g., causing system error) within the secondary controller 218 if the input clock signal (SCL 222) is switched back to the off-chip SCL 208 while the signal is not stable. That is, if the secondary controller 218 attempts to lock onto a new clock signal (e.g., the off-chip SCL 208) at the exact time that the signal is toggling from the low-to-high or high-to-low, this can cause the secondary controller 218 to lock up and generate system error.

To mitigate this risk, hot-join deadlock solver 202 waits to toggle the select input to the multiplexor 216 until a time when it can be certain that the off-chip SCL 208 is going to remain stable for the duration of time that it takes for the secondary controller 218 to lock onto the new clock signal following the switch.

In one implementation, the safe SCL mux controller 212 achieves the foregoing by monitoring one or both of the off-chip SDA 207 and the off-chip SCL 208 to identify a start signature signifying a "start" of a predefined event type. In different implementations, the predefined event type may differ; however, the predefined event type is a known (recognized) event to lock onto the new clock signal. For example, it takes on the order of 1 nanosecond (e.g., 1 clock tick) for the secondary controller 218 to lock onto the new clock signal, and the predefined event type has a length on the order of tens of nanoseconds or longer. When the safe SCL mux controller 212 sees the start signature of the predefined event type in the off-chip SCL 208 (and/or the off-chip SDA 207), the safe SCL mux controller 212 then immediately toggles the select of the multiplexor 216 to switch the clock source driving the off-chip SCL 208 from the on-chip clock to the off-chip clock (e.g., the primary controller clock). Following this action, the SDA 220 and SCL 222 are both being driving by the off-chip sources (external to the hot-join deadlock solver 202) and the system can function nominally, as if the hot-join deadlock solver 202 were not present in the interface between the slave device 206 and the primary controller.

FIG. 3 illustrates a pair of SDA and SCL signals 300 that include example event types that are usable to safely trigger toggling a clock input to a secondary controller between two different clock sources. Specifically, the SDA and SCL signals 300 include characteristics plausibly present within the off-chip SDA and off-chip SCL signals that are monitored, in FIG. 3, by the safe mux controller 312.

As mentioned above with respect to FIG. 3, controller hardware can glitch and generate system error if the duration of the secondary controller's "lock" on a new clock signal overlaps with the transition of the clock signal from high-to-low or low to high. Therefore, the two events illustrated in FIG. 3 are representative of event types that have a uniquely recognizable start signature and that are of a duration safely exceeding (e.g., by 25% or more) a known amount of time that it takes for an I3C controller to lock onto a new SCL signal.

The example signals 300 includes start signatures of at least two different types of events that could plausibly serve as the above-mentioned "predefined event type" that the safe SCL mux controller 212 of FIG. 2 uses as a trigger to toggle the clock input source to the secondary controller 222. Specifically, the signals 300 include a transaction start condition 302 that is, in I3C, characterized by the SDA line being pulled low at a time when the SCL line is high. According to mipi I3C standard v1.0, an I3C start condition is typically held for a minimum duration of 38.4 nanoseconds while the stop condition is held for a minimum of 20 nanoseconds, both of which significantly exceed the time that it takes for an I3C controller to lock onto a new clock signal (e.g., less than 5 nanoseconds). Thus, the beginning of a start or stop condition serves as a predefined event type that could be "seen" by a hot-join deadlock solver 202 and used as a timing trigger to safely toggling a source of clock input to an I3C controller.

Another example predefined event type that could be used as a trigger for safely toggling the source of I3C controller clock input is the observance of a posedge (i.e., rising-edge) side of the clock signal (e.g., the clock signal of the primary controller). Given that the duration of each emitted square clock pulse exceeds known time that it takes for the controller to lock into a new SCL signal, observance of the posedge side of a clock pulse is a sufficient indicator that the clock signal is going to remain stable for a time duration long enough for the lock on the new signal to be safely achieved. Therefore, in one implementation, the hot-join deadlock solver 202 waits to observe the posedge side of the master clock signal and uses this event as the timing trigger to toggle the select of an SCL multiplexor providing a clock signal to a secondary controller.

In other implementations, signatures of other predefined event types may be used as the basis for toggling the clock of the secondary controller from the on-chip clock to the off-chip clock (e.g., as described above with respect to FIG. 2).

FIG. 4 illustrates example operations 400 for preventing deadlock following slave device reset in an I3C bus. A first detection operation 402 detects a reset event indicator indicating that a reset pattern is being executed on an I3C slave controller currently in a reset state. The reset event indicator is, in one implementation, the opening of a clock input line to the slave controller, which is detectable by a hot-join deadlock solver coupled to the slave controller as shown in the configurations of FIG. 1 or FIG. 2.

In response to detecting the reset event indicator, an artificial transaction operation 404 drives an on-chip clock and an on-chip data source to transmit a signal pattern to the slave controller that mimics a transaction from a master controller. The on-chip clock and on-chip-data source are "on-chip" in the sense that they are located on a same chip as the mechanism driving the on-chip clock and the on-chip data source. In one implementation, the transmitted signal pattern begins with an asserted "start condition," includes a short sequence of data bits coinciding with each of multiple clock cycles and ends with an asserted "stop condition." In one implementation, the signal pattern transmitted by the artificial transaction operation 404 has the effect of assisting the slave controller in exiting a reset state by providing the slave controller with an input clock signal usable to perform a clock synchronization step in the reset pattern.

Following transmission of the signal pattern, the slave controller is able to self-execute the remainder of the reset pattern and exit the reset state. A toggling operation 406 toggles a data signal (SDA) input to the slave controller from the on-chip data source to an off-chip data source, and a monitoring operation 408 monitors external (e.g., main bus) signals emitted by an off-chip clock (e.g., the master controller) and by an off-chip data source (e.g., the master controller or other controller transmitted data along a main bus SDA line) to determine a safe time to toggle a clock signal input to the slave controller.

Based on the monitoring operation 408, a detection operation 410 detects a start signature of a predefined event type. The predefined event type is a recognized event characterized by a stable (unchanging) clock signal for a time duration that exceeds a defined threshold (e.g., the amount of time that it takes a slave controller to lock into a new clock signal). For example, the start signature of the predefined event type may be the onset of an asserted start condition (e.g., where the SDA is pulled low while the SCL is high). In another implementation, the start signature of the predefined event type is a posedge side of a clock pulse.

In response to detecting the start signature of the predefined event type, a toggling operation 412 toggles the select on a clock signal mux that selects the clock signal input to the slave controller. This toggling switches the selected clock signal from the on-chip clock to the off-chip clock. This toggling of the clock signal allows the secondary controller 218 to lock onto the clock signal of the primary (master) controller, which is used to synchronize communications sent to and from various devices across the IC3 bus.

Figure 5:
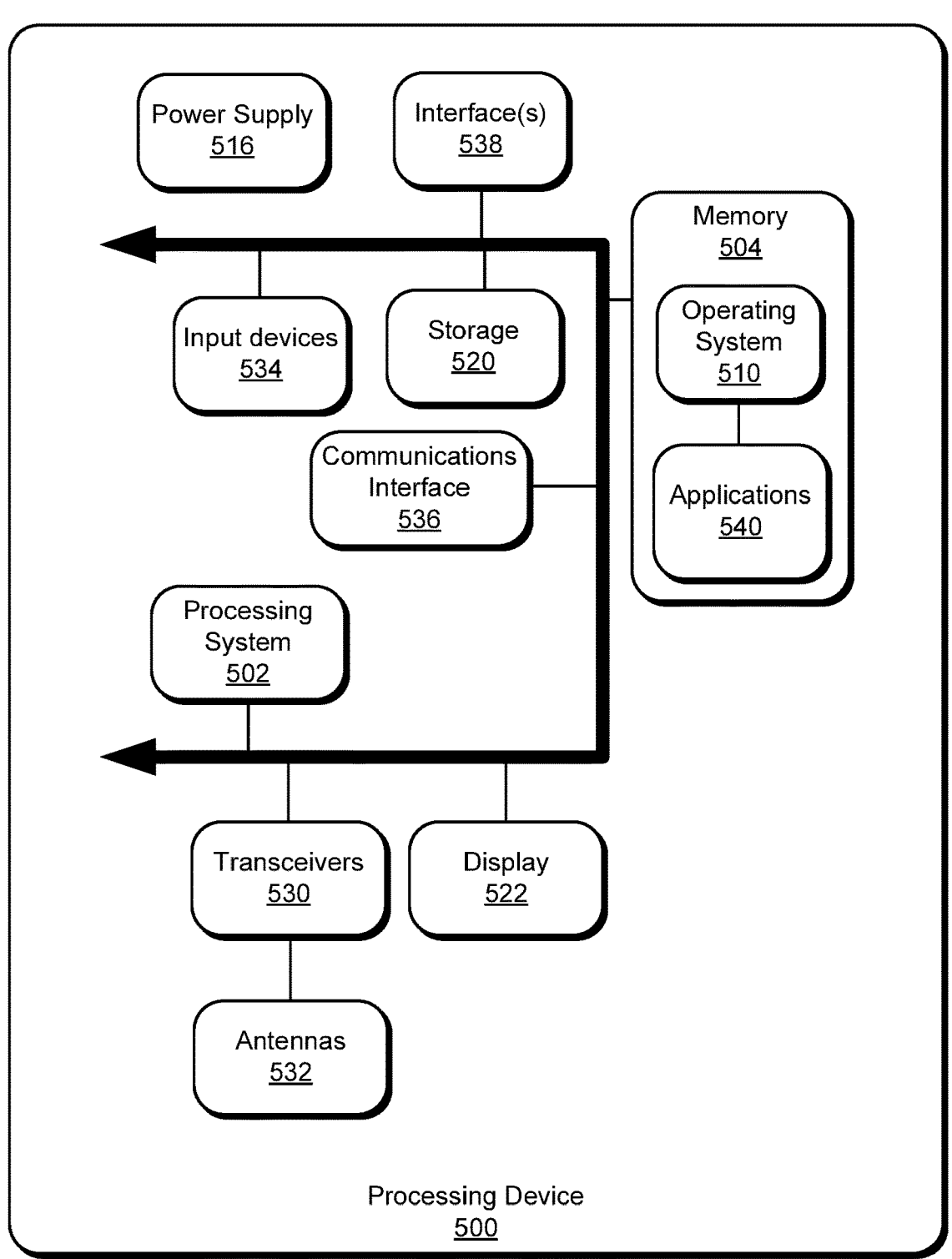
FIG. 5 illustrates an example schematic of a processing device suitable for implementing aspects of the disclosed technology.

FIG. 5 illustrates an example schematic of a processing device 500 suitable for implementing aspects of the disclosed technology. In one implementation, the processing device 500 is a device that communicates with other processing devices over an IC3 bus. In another implementation, the processing device 500 includes an I3C bus and multiple devices (e.g., slave device(s), master device(s)) that communicate with one another over the I3C bus.

The processing device 500 includes a processing system 502, memory device(s) 504, the display 506, and other interfaces 508 (e.g., buttons). The memory device(s) 504 generally includes both volatile memory (e.g., RAM) and non-volatile memory (e.g., flash memory). An operating system 510 may reside in the memory device(s) 504 and be executed by the processing system 502. One or more applications 512 may be loaded in the memory and executed on the operating system 510 by the processing system 502. The processing system 502 may include one or more processors (e.g., CPUs, GPUs) configured to communicate with other processing entitles (e.g., subsystems, chips, or compute device accessories) over an I3C bus.

The processing device 500 includes a power supply 516, which is powered by one or more batteries or other power sources and which provides power to other components of the processing device 500. Additionally, the processing device 500 includes one or more communication transceivers 530 and an antenna 532 to provide network connectivity (e.g., a mobile phone network, Wi-Fi®, BlueTooth®). The processing device 500 may be further coupled (e.g., via an I3C bus or otherwise) to various input devices 534 such as a microphone, keyboard, touch display, etc. In one implementation, I3C controller logic is stored as firmware locally executed by a microprocessor in a I3C controller attached to one or more of the input devices 534, the communications interface 526, components of the processing system 502, or any other component of the processing device 500.

The memory device(s) 504 may be memory of host device or of an accessory that couples to a host. The processing device 560 may include a variety of tangible computer-readable storage media and intangible computer-readable communication signals. Tangible computer-readable storage can be embodied by any available media that can be accessed by the processing device 500 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing device 600. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The following summary provides a non-exhaustive set of illustrative examples of the technology set forth herein. An example IC disclosed herein comprises a deadlock solver that provides a communication interface between a primary controller and a secondary controller. The deadlock solver stores control logic executable to detect a reset event indicator on the secondary controller that is indicative of a reset event pattern executing on the secondary controller while the secondary controller is in a reset state. Based at least in part on detection of the reset event indicator, the deadlock solver transmits a signal pattern to the secondary controller that mimics a transaction from a primary controller. The signal pattern assists the secondary controller in exiting a reset state.

In another example IC of any preceding IC, the IC further comprises first switching circuitry configured to selectably toggle a data input source of an SDA signal provided to the secondary controller and second switching circuitry configured to selectably toggle a clock input source of a serial clock (SCL) signal provided to the secondary controller. The data input source is selectably toggled between an on-chip data source and an off-chip data source, and the clock input source is selectably toggled between an on-chip clock and an off-chip clock.

In another example IC of any preceding IC, control logic of the deadlock solver is further executable to drive the on-chip clock and the on-chip data source to transmit the signal pattern that mimics the transaction from the primary controller while the on-chip data source is selected as the data input source of the SDA signal and while the on-chip clock is selected as the clock input source of the SCL signal.

In another example IC of any preceding IC, the control logic of the deadlock solver is further executable to select the off-chip data source as the data input source of the SDA signal to the secondary controller after transmitting the signal pattern; monitor external signals emitted by at the off-chip clock and the off-chip data source; and based at least in part on detecting a start signature of a predefined event type in the external signals, select the off-chip clock as the clock input source of the SCL signal to the secondary controller.

In another example IC of any preceding IC, the primary controller and the secondary controller are configured to communicate through the deadlock solver via an I3C protocol.

In another example IC of any preceding IC, the predefined event type includes a start condition. In another example IC of any preceding IC, the the predefined event type includes detection of a posedge in a signal generated by the off-chip clock.

In still another example IC of any preceding IC, the secondary controller is configured to monitor signals emitted by the off-chip clock and the off-chip data source and, based at least in part on determining that the signals satisfy a Bus Idle Condition, pull the SDA signal to a zero state and wait for the primary controller to assign a dynamic address to the secondary controller.

An example method disclosed herein provides for detecting a reset event indicator on a secondary controller that is indicative of a reset event pattern executing on the secondary controller while the secondary controller is in a reset state. The method further provides for transmitting a signal pattern to the secondary controller that mimics a transaction from a primary controller. This transmission is based at least in part on detection of the reset event indicator, and the signal pattern is effective to assist the secondary controller in exiting the reset state.

In another example method of any preceding method, the signal pattern is transmitted to the secondary controller from a deadlock solver, and the deadlock solver provides a communication interface between the secondary controller and a primary controller.

In still another example method of any preceding method, the deadlock solver further includes first switching circuitry configured to selectably toggle a data input source of an SDA signal received at the secondary controller and second switching circuitry configured to selectably toggle a clock input source of a serial clock (SCL) signal received at the secondary controller. The data input source is selectably toggled between an on-chip data source and an off-chip data source, and the clock input source is selectably toggled between an on-chip clock and an off-chip clock.

In another example method of any preceding method, transmitting the signal pattern further comprises driving the on-chip clock and the on-chip data source to transmit the signal pattern while the on-chip data source is selected as the input source of the SDA signal and while the on-chip clock is selected as the input source of the SCL signal.

In still another example method of any preceding method, the method further comprises selecting the select the off-chip data source as the data input source of the SDA signal to the secondary controller after transmitting the signal pattern; monitoring external signals emitted by the off-chip clock and the off-chip data source; and based at least in part on detecting a start signature of a predefined event type in the external signals, selecting the off-chip clock as the clock input source of the SCL signal to the secondary controller.

In still another example method of any preceding method, the primary controller and the secondary controller are configured to communicate via an I3C protocol.

In another example method of any preceding method, detecting the start signature of the predefined event type includes detecting a start condition or detecting a posedge in the SCL signal.

In still another example method of any preceding method, the method further comprises monitoring, by the secondary controller, the SDA signal and the SCL signal and, based at least in part on determining that the SDA signal and the SCL signal satisfy a Bus Idle Condition, pulling the SDA signal to a zero state and waiting for a primary controller to assign a dynamic address to the secondary controller.

An example system disclosed herein includes first switching circuitry configured to selectably toggle a data input source of an SDA signal input to a secondary controller, and second switching circuitry configured to selectably toggle a clock input source of a serial clock (SCL) signal to the secondary controller. The data input source is selectably toggled between an on-chip data source and an off-chip data source, while the clock input source is selectably toggled between an on-chip clock and an off-chip clock. The system further includes control logic executable to detect a reset event indicator on the secondary controller and, based at least in part on the detection of the reset event indicator, drive the on-chip clock and the on-chip data source to transmit a signal pattern while the on-chip data source is selected as the data input source of the SDA signal and while the on-chip clock is selected as the clock input source of the SCL signal. The signal pattern mimics a transaction from a primary controller that is effective to assist the secondary controller in exiting a reset state.

In another example system of any preceding system, the control logic is further executable to select the off-chip data source as the data input source of the SDA signal to the secondary controller after transmitting the signal pattern; monitor external signals emitted by at the off-chip clock and the off-chip data source; and based at least in part on detection of a start signature of a predefined event type in the external signals, select the off-chip clock as the clock input source of the SCL signal to the secondary controller.

In another example system of any preceding system, the primary controller and the secondary controller are configured to communicate via an I3C protocol.

In another example system of any preceding system, detecting the predefined event type includes detecting a start condition or detecting a posedge in the SCL signal.

An example system disclosed herein includes a means for detecting a reset event indicator on a secondary controller that is indicative of a reset event pattern executing on the secondary controller while the secondary controller is in a reset state. The method further provides a means for transmitting a signal pattern to the secondary controller that mimics a transaction from a primary controller in response to detection of the reset event pattern. The signal pattern effective to assist the secondary controller in exiting the reset state.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. An integrated circuit (IC) comprising:
a deadlock solver that provides a communication interface between a primary controller and a secondary controller, the deadlock solver storing control logic executable to:
detect a reset event indicator on the secondary controller, the reset event indicator being indicative of a reset event pattern executing on the secondary controller while the secondary controller is in a reset state; and
based at least in part on detection of the reset event indicator, transmit a signal pattern to the secondary controller that mimics a transaction from a primary controller, the transaction including a clock signal that the secondary controller uses to reset an internal clock during a reset pattern that the secondary controller performs to exit the reset state.

2. The IC of claim 1, further comprising:
first switching circuitry configured to selectably toggle a data input source of an SDA signal provided to the secondary controller, the data input source being selectably toggled between an on-chip data source and an off-chip data source;
second switching circuitry configured to selectably toggle a clock input source of a serial clock (SCL) signal provided to the secondary controller, the clock input source being selectably toggled between an on-chip clock and an off-chip clock.

3. The IC of claim 2, wherein control logic of the deadlock solver is further executable to:

drive the on-chip clock and the on-chip data source to transmit the signal pattern that mimics the transaction from the primary controller while the on-chip data source is selected as the data input source of the SDA signal and while the on-chip clock is selected as the clock input source of the SCL signal.

4. The IC of claim 2, wherein the control logic of the deadlock solver is further executable to:

after transmitting the signal pattern, select the off-chip data source as the data input source of the SDA signal to the secondary controller;

monitor external signals emitted by at the off-chip clock and the off-chip data source; and based at least in part on detecting a start signature of a predefined event type in the external signals, select the off-chip clock as the clock input source of the SCL signal to the secondary controller.

5. The IC of claim 1, wherein the primary controller and the secondary controller are configured to communicate through the deadlock solver via an I3C protocol.

6. The IC of claim 4, wherein the predefined event type includes a start condition.

7. The IC of claim 4, wherein the predefined event type includes detection of a posedge in a signal generated by the off-chip clock.

8. The IC of claim 2, wherein the secondary controller is configured to:

based at least in part on exiting the reset state, monitor signals emitted by the off-chip clock and the off-chip data source; and based at least in part on determining that the signals satisfy a Bus Idle Condition, pull the SDA signal to a zero state and wait for the primary controller to assign a dynamic address to the secondary controller.

9. A method comprising:

detecting a reset event indicator on a secondary controller, the reset event indicator being indicative of a reset event pattern executing on the secondary controller while the secondary controller is in a reset state; and based at least in part on detection of the reset event indicator, transmitting a signal pattern to the secondary controller that mimics a transaction from a primary controller, the transaction including a clock signal that the secondary controller uses to reset an internal clock during a reset pattern that the secondary controller performs to exit the reset state.

10. The method of claim 9, wherein the signal pattern is transmitted to the secondary controller from a deadlock solver, the deadlock solver providing a communication interface between the secondary controller and a primary controller.

11. The method of claim 10, wherein the deadlock solver further includes:

first switching circuitry configured to selectably toggle a data input source of an SDA signal received at the secondary controller, the data input source being selectably toggled between an on-chip data source and an off-chip data source; and second switching circuitry configured to selectably toggle a clock input source of a serial clock (SCL) signal received at the secondary controller, the clock input source being selectably toggled between an on-chip clock and an off-chip clock.

12. The method of claim 11, wherein transmitting the signal pattern further comprises:

driving the on-chip clock and the on-chip data source to transmit the signal pattern while the on-chip data source is selected as the data input source of the SDA signal and while the on-chip clock is selected as the data input source of the SCL signal.

13. The method of claim 11, further comprising:

after transmitting the signal pattern, selecting the off-chip data source as the data input source of the SDA signal to the secondary controller;

monitoring external signals emitted by the off-chip clock and the off-chip data source; and based at least in part on detecting a start signature of a predefined event type in the external signals, selecting the off-chip clock as the clock input source of the SCL signal to the secondary controller.

14. The method of claim 9, wherein the primary controller and the secondary controller are configured to communicate via an I3C protocol.

15. The method of claim 13, wherein detecting the start signature of the predefined event type includes detecting a start condition or detecting a posedge in the SCL signal.

16. The method of claim 13, further comprising:

monitoring, by the secondary controller, the SDA signal and the SCL signal;

based at least in part on determining that the SDA signal and the SCL signal satisfy a Bus Idle Condition, pulling the SDA signal to a zero state and waiting for a primary controller to assign a dynamic address to the secondary controller.

17. A system comprising:

first switching circuitry configured to selectably toggle a data input source of an SDA signal input to a secondary controller, the data input source being selectably toggled between an on-chip data source and an off-chip data source;

second switching circuitry configured to selectably toggle a clock input source of a serial clock (SCL) signal to the secondary controller, the clock input source being selectably toggled between an on-chip clock and an off-chip clock; and control logic executable to detect a reset event indicator on the secondary controller and, based at least in part on the detection of the reset event indicator:

drive the on-chip clock and the on-chip data source to transmit a signal pattern while the on-chip data source is selected as the data input source of the SDA signal and while the on-chip clock is selected as the clock input source of the SCL signal, the signal pattern mimicking a transaction from a primary controller that is effective to assist the secondary controller in exiting a reset state.

18. The system of claim 17, wherein the control logic is further executable to:

after transmitting the signal pattern, select the off-chip data source as the data input source of the SDA signal to the secondary controller;

monitor external signals emitted by at the off-chip clock and the off-chip data source; and based at least in part on detection of a start signature of a predefined event type in the external signals, select the off-chip clock as the clock input source of the SCL signal to the secondary controller.

19. The system of claim 17, wherein the primary controller and the secondary controller are configured to communicate via an I3C protocol.

20. The system of claim 18, wherein detection of the predefined event type includes detection of a start condition or detection of a posedge in the SCL signal.

\* \* \* \* \*